Sept. 7, 1926.
L. E. PURKEY
POTATO CUTTER
Filed March 12, 1923
1,599,346
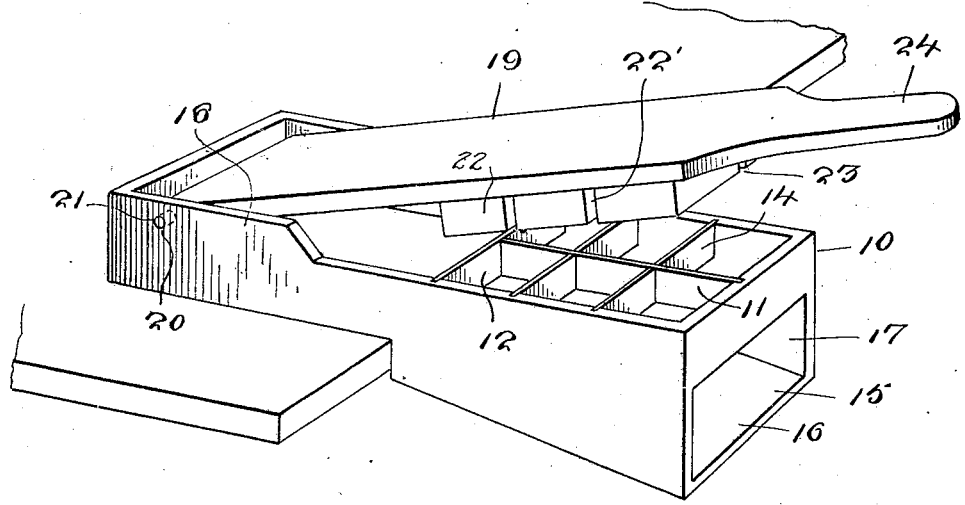
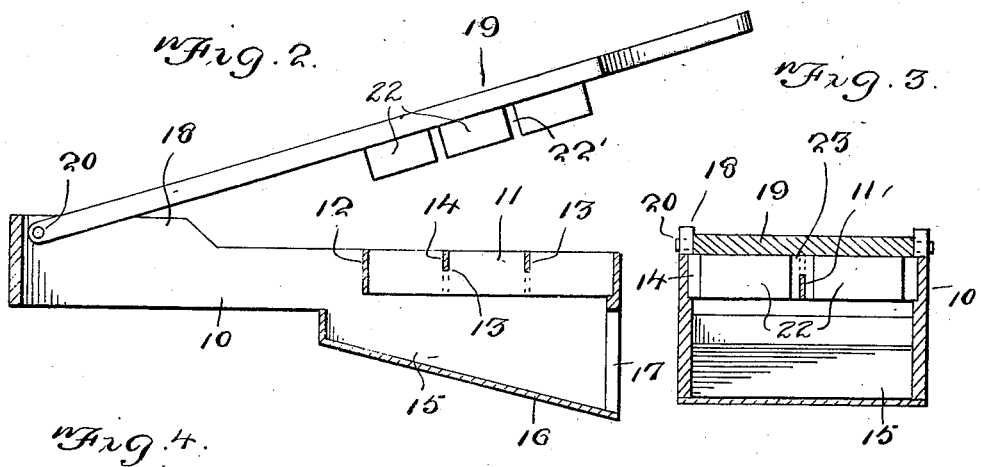
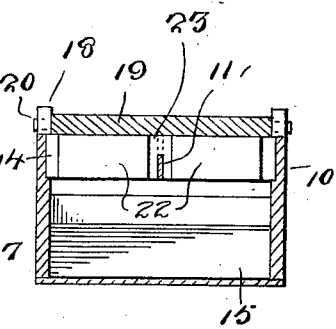
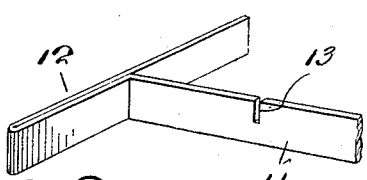
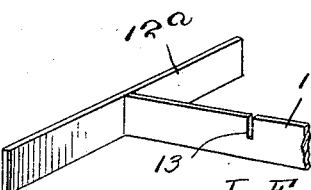
L. E. Purkey
INVENTOR
BY Victor J. Evans
ATTORNEY Patented Sept. 7, 1926.

1,599,346

UNITED STATES PATENT OFFICE.

LESLIE E. PURKEY, OF POCATELLO, IDAHO.

POTATO CUTTER.

Application filed March 12, 1923. Serial No. 624,612.

This invention relates to improvements in cutting devices and has for an object the provision of means which is especially adapted for cutting potatoes, the invention providing efficient and convenient means for quartering seed potatoes.

Another object of the invention is the provision of a cutting device which includes means in the form of a delivery sheet which is arranged beneath the cutting blade, whereby the cut potatoes may be directed into a suitable receptacle.

Another object of the invention is the provision of a cutting device in which the pressure bar is guided in its movement to insure proper operation, the said guiding means also serving to provide means whereby the pressure bar may be pivotally mounted.

With the above and other objects in view, the invention further includes the following novel features and details of construction, to be hereinafter more fully described, illustrated in the accompanying drawings and pointed out in the appended claims.

In the drawings:—

Figure 1 is a perspective view of the invention with the pressure bar partly raised.

Figure 2 is a longitudinal sectional view of the same.

Figure 3 is a transverse section.

Figure 4 is a detail perspective view of one form of cutting blades.

Figure 5 is a similar view of another form.

Referring in detail to the drawings, wherein like characters of reference denote corresponding parts, the reference character 10 indicates an elongated frame of rectangular configuration. Located within one end of the frame are longitudinally and transversely disposed cutting blades, the former comprising a blade 11, having one end secured to one of the end bars of the frame 10 and its opposite end provided with oppositely and laterally extending portions 12, which are secured to the opposite side bars of the frame 10. The blade 11 is provided with spaced slots 13 which receive transverse cutting blades 14, the latter also being slotted for a portion of their width, so that the upper or cutting edges of the blades will lie in substantially the same horizontal plane.

Arranged beneath the blades 11 and 14 is a delivery chute 15, the latter being provided with parallel side walls and an inclined bottom wall, indicated at 16. The bottom wall 16 inclines downwardly and outwardly toward the end of the chute and this end of the chute is open, as indicated at 17. The potatoes which are cut by the knives 11 and 14 will thus fall downward into the chute 15 and will be directed by the inclined bottom 16 into a suitable receptacle. The device may be arranged upon a table or similar support with the sheet overhanging the edge of the table, or the entire device may rest upon the table and any suitable means provided for supporting the end of the frame opposite the chute 15, so that the frame will be substantially horizontal.

The end of the frame opposite the chute 15 is raised so as to provide a flange 18 which extends transversely along the end of the frame and for an appreciable distance along the opposite side rails. Pivotally mounted within this flange is one end of a pressure bar 19, the said bar having extending from opposite edges thereof trunnions 20 which have bearings in openings 21 provided in the flange 18. This flange thus serves a twofold purpose, namely that of providing a guide for the pressure bar 19 so that the latter will not wobble from side to side, and for providing a bearing means for the trunnions 20.

The opposite end of the pressure bar 19 is provided upon its under face with spaced parallel blocks 22 defining longitudinal and transverse grooves 22 and 23 respectively, the said grooves being adapted to receive the cutting edges of the blades 11 and 14 respectively, proper register between these blades and grooves being assured by the guide flange 18. The pressure bar is extended beyond the end of the frame 10 so as to provide an operating handle 24. Various means may be employed for forming the cutting blades, for example the blade 11 may be bent laterally and then folded upon itself as indicated in Figure 4 of the drawings so as to provide the oppositely offset portions 12 for attachment to the side bars of the frame 10. If desired, the offset portions may be welded to the end of the cutting blade 11 as indicated in Figure 5 of the drawings, wherein the said offset portions are indicated at 12ª.

The invention is susceptible of various changes in its form, proportions and minor details of construction and the right is herein reserved to make such changes as properly fall within the scope of the appended claim.

Having described the invention what is claimed is:—

In a potato cutter of the character described, a substantially T-shaped cutting blade having transverse slots in its vertical leg, a rectangular frame, having downwardly extending slots to receive the ends of the T-shaped bar, and a plurality of transversely disposed auxiliary cutting blades being slotted intermediate their lengths for interfitting engagement with the slotted portions of the T-bar, and having their opposite ends supported by slots in the frame.

In testimony whereof I affix my signature.

LESLIE E. PURKEY.